United States Patent
González Moreno

(10) Patent No.: US 8,207,483 B2
(45) Date of Patent: Jun. 26, 2012

(54) SOLAR ENERGY TRACKER WITH PARABOLIC LATTICE STRUCTURE AND A POLYGONAL COUPLING

(75) Inventor: José Abel González Moreno, Fustiñana (ES)

(73) Assignee: Mecanizados Solares, S.L., Fustiñana (Navarra) (ES)

( * ) Notice: Subject to any disclaimer, the term of this patent is extended or adjusted under 35 U.S.C. 154(b) by 343 days.

(21) Appl. No.: 12/605,208

(22) Filed: Oct. 23, 2009

(65) Prior Publication Data

US 2011/0000479 A1    Jan. 6, 2011

(30) Foreign Application Priority Data

Jul. 1, 2009  (ES) .................................. 200901075

(51) Int. Cl.
*G01C 21/02*  (2006.01)

(52) U.S. Cl. ...................................... 250/203.4; 250/239
(58) Field of Classification Search ............... 250/203.4, 250/239, 214 R, 216; 136/244–259; 126/575–607
See application file for complete search history.

(56) References Cited

U.S. PATENT DOCUMENTS 6,971,756 B2 * 12/2005 Vasylyev et al. .............. 359/852
7,968,791 B2 *  6/2011 Do et al. ....................... 136/246

* cited by examiner

*Primary Examiner* — Que T Le
(74) *Attorney, Agent, or Firm* — Lucas & Mercanti, LLP

(57) ABSTRACT

The invention relates to a solar tracker with thermal concentration, formed by a distribution of mirrors (2.1) in a parabolic cylindrical formation focused towards an area of projection of the solar rays striking the mirrors (2.1), comprising a lattice structure forming arms (6) provided on the front edge with a curved profile (6.1), on which the mirrors (2.1) are arranged, whereas with respect to the lattice structure there is arranged a rotary drive mechanism, which is coupled to said lattice structure by means of a polygonal coupling through a torsion box (8).

3 Claims, 4 Drawing Sheets

SOLAR ENERGY TRACKER WITH PARABOLIC LATTICE STRUCTURE AND A POLYGONAL COUPLING

CROSS REFERENCE TO RELATED APPLICATIONS

This Application claims the benefit of priority of Spanish Patent Application No.: 200901075 filed Jul. 1, 2009 the entire contents of which are hereby incorporated by reference.

FIELD OF THE ART

The present invention relates to the use of solar energy, proposing a device for capturing said energy formed by a thermal concentrator made up of mirrors in a parabolic cylindrical distribution, with a design facilitating the assembly of the mirrors, and a drive arrangement allowing the rotation of the structural assembly with complete precision for solar tracking.

STATE OF THE ART

One of the processes used today to acquire thermal energy is the use of solar energy, using solar concentrators, which consist of structures that are able to concentrate solar energy in a reduced area in order to achieve a calorific effect with high energy intensity. Said concentrators reflect the sunlight by means of an arrangement of mirrors aligned towards a target that is able to capture said energy for its use.

Concentrators having a parabolic cylindrical arrangement of mirrors are known in that sense, by means of which mirrors the rays of sunlight are reflected towards a duct coaxially assembled in the focal axis of the parabolic cylindrical arrangement, such that by circulating a fluid through said duct, said fluid is heated, being able to be used later for any application.

According to a conventional arrangement, parabolic cylindrical concentrators rotate about an axis of rotation in order to always be oriented towards the sun for the purpose of maximizing the solar radiation which is reflected on the circulation duct of the fluid to be heated, the axis of rotation coinciding with the axis of the parabola formed by the mirrors of the concentrator.

Said parabolic cylindrical concentrators furthermore consist of a structure made up of support arms on which the mirrors are placed, a drive system being arranged with respect to said structure in order to rotate the assembly for the sun tracking movement, the mobile assembly being mounted on support pillars.

There are implementations of parabolic cylindrical concentrators with the support structure for supporting the mirrors formed with sheet metal arms attached on a longitudinal bearing pipe, such as the solutions of Patents ES466393, U.S. Pat. No. 4,432,343 and DE19952276, the sheet metal arms being able to be made with openings to reduce costs and weight by reducing the material, such as the solution of Patent ES2274710.

There are also implementations of parabolic cylindrical concentrators formed with lattice structures, for example such as the solution of Patent ES200702720, with the support arms for supporting the mirrors also formed by a lattice structure, which in known solutions of this type of implementation form a polygonal-shaped edge for incorporating the mirrors, making it difficult to assemble the mirrors because it forces using different sized securing parts between the mirrors and the corresponding support arm according to the placement points, so it is necessary to have different securing parts and to have to select them in order to assemble the mirrors.

In addition, the conventional implementations of solar trackers with thermal concentration by means of a parabolic cylindrical concentrator have a rotary drive transmission for tracking the sun, with the coupling of the support structure for supporting the parabolic cylindrical concentrator to said transmission by means of a cylindrical fastener, generating the possibility of said coupling slipping in the rotary drive of the solar tracker, thereby losing the reliability of the accuracy of the sun tracking movement.

OBJECT OF THE INVENTION

According to the invention a parabolic cylindrical solar tracker with thermal concentration with a lattice structure is proposed, having features facilitating the assembly of the mirrors and assuring the precision of the sun tracking movement.

This solar tracker object of the invention consists of a lattice structure which forms arms by means of which a parabolic cylindrical shape is defined for the placement of the mirrors making up the arrangement for concentrating solar rays, each of the arms being formed by an assembly of attached profiles on the front edge of which there is arranged a profile which is curved according to the curvature of the parabolic cylindrical formation for the placement of the mirrors making up the thermal concentrator.

A structural assembly which satisfactorily solves the complexity of the assembly of the mirrors of the parabolic cylindrical thermal concentrator is thus obtained, since the curved profile of the front edge of the support arms for supporting the mirrors allows the assembly of the mirrors with identical securing parts, independently of the fastening points at which said securing parts are placed.

Therefore only a single type of fastening part is needed for securing the mirrors on the arms of the support structure, without having to use different types of fastening parts according to the placement points thereof.

The support structure for supporting the parabolic cylindrical thermal concentrator of said solar tracker object of the invention is arranged associated with a rotary drive to perform the sun tracking movement, said support structure for supporting the parabolic cylindrical thermal concentrator having to that end a torsion box on which the transmission shaft of the rotary drive is coupled.

Said torsion box of the support structure for supporting the parabolic cylindrical thermal concentrator forms a polygonal shape, in which an accordingly polygonal portion of the transmission shaft of the rotary drive fits.

Coupling of the rotary transmission to the solar tracker, which assures complete accuracy of the rotational movement of the structural assembly of the parabolic cylindrical concentrator for tracking the sun, is thus obtained because the polygonal coupling prevents the possibility of slipping in the rotary drive transmission.

Therefore, said solar thermal tracker object of the invention has truly advantageous features, its embodiment acquiring its own identity and a preferred character with respect to the solar trackers with thermal concentration known in the state of the art.

DETAILED DESCRIPTION OF THE INVENTION

Figure 1:
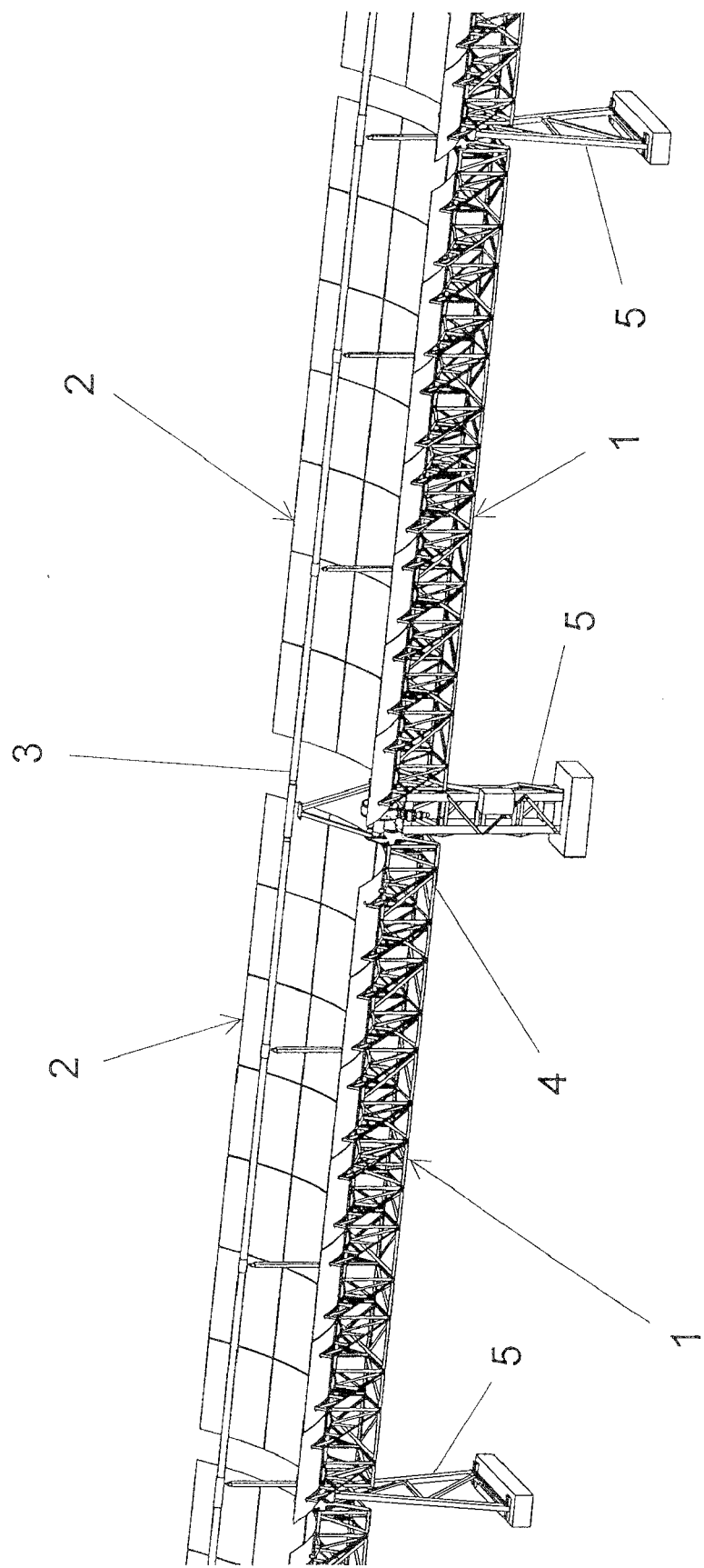
FIG. 1 is a partial perspective view of a solar thermal tracker with a parabolic cylindrical concentrator according to the invention.
Figure 2:
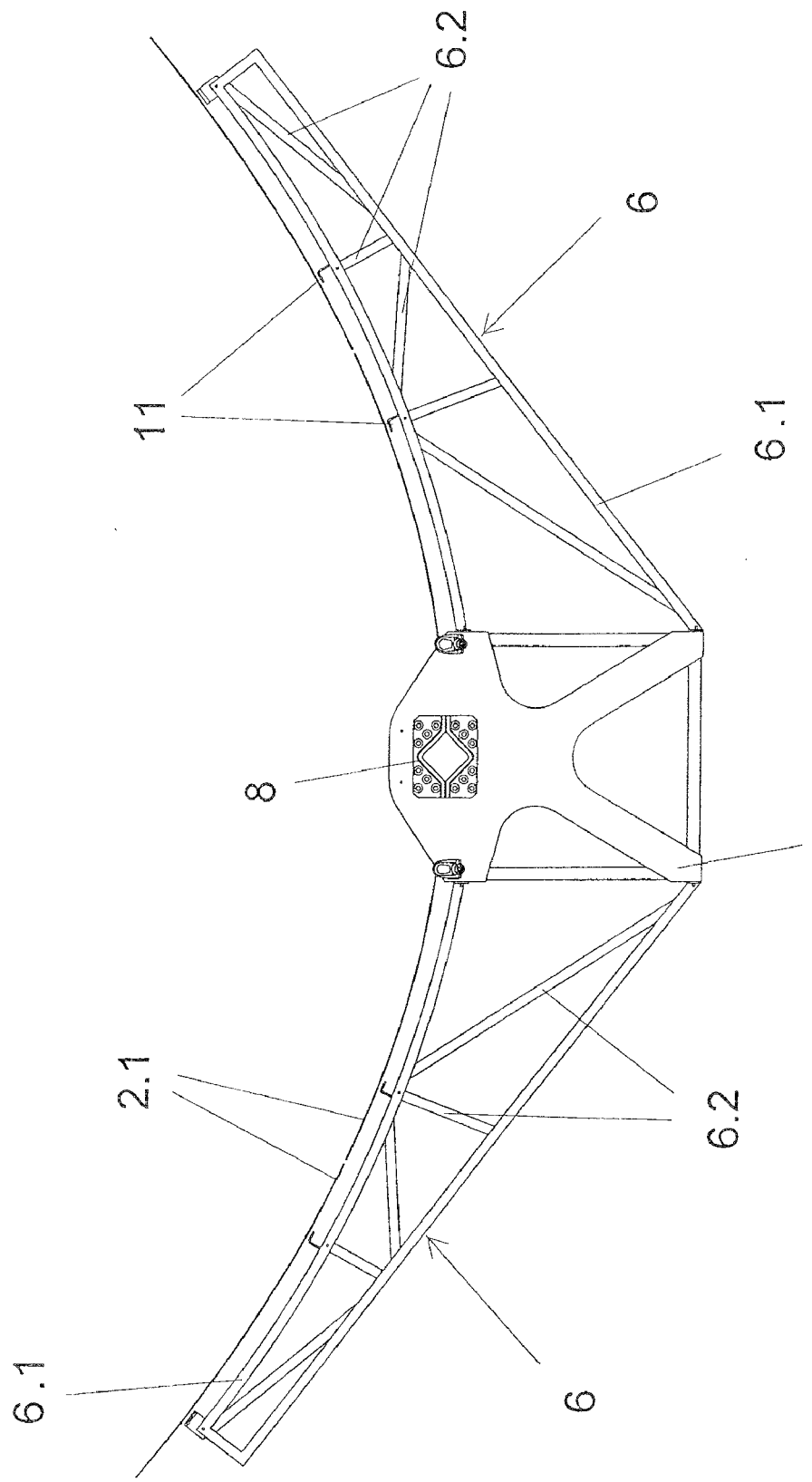
FIG. 2 is a profile view of the structural assembly of the parabolic cylindrical concentrator of the solar thermal tracker of the previous figure.
Figure 3:
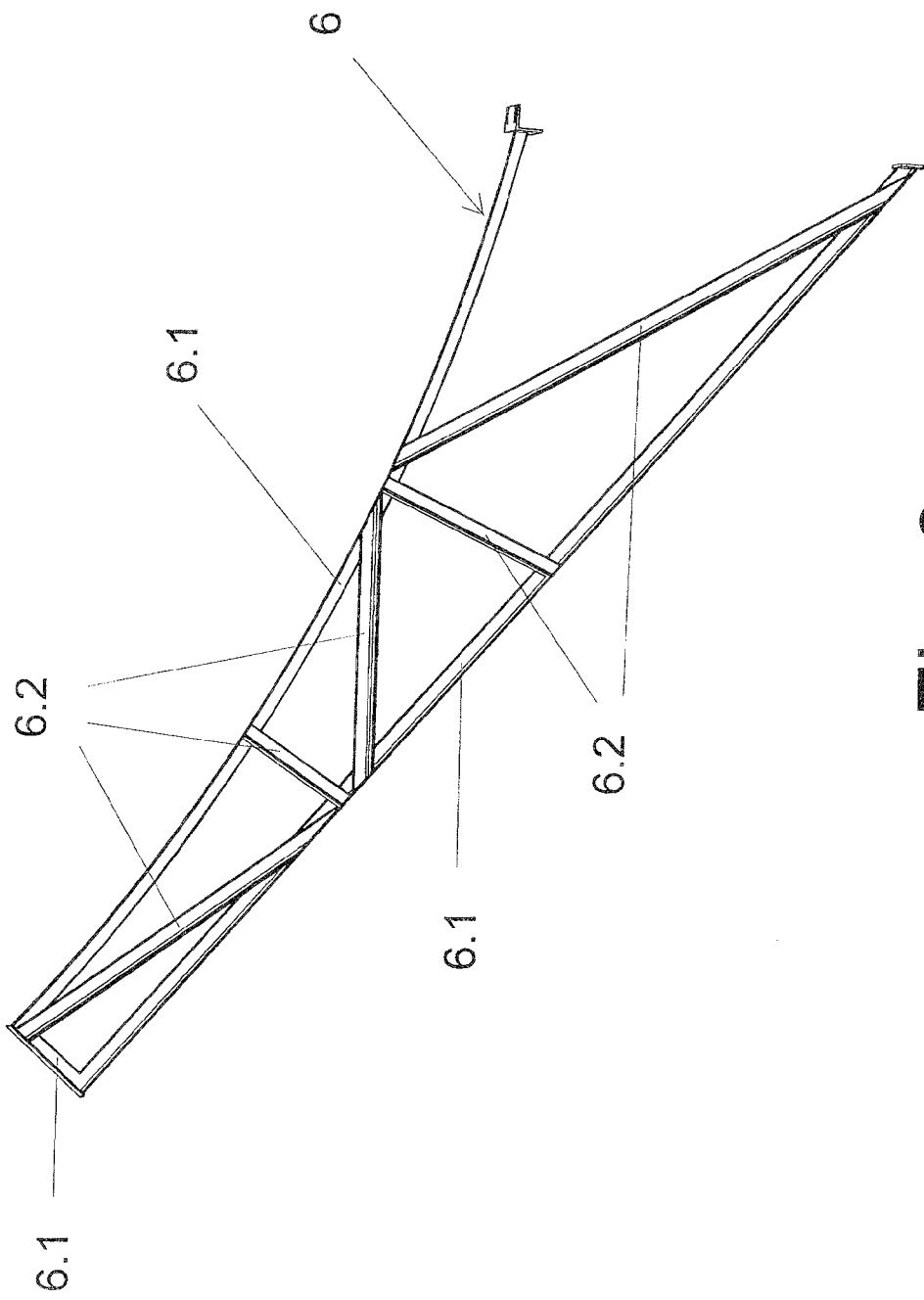
FIG. 3 is a side view of one of the support arms for supporting the mirrors of the parabolic cylindrical concentrator in the proposed solar thermal tracker.
Figure 4:
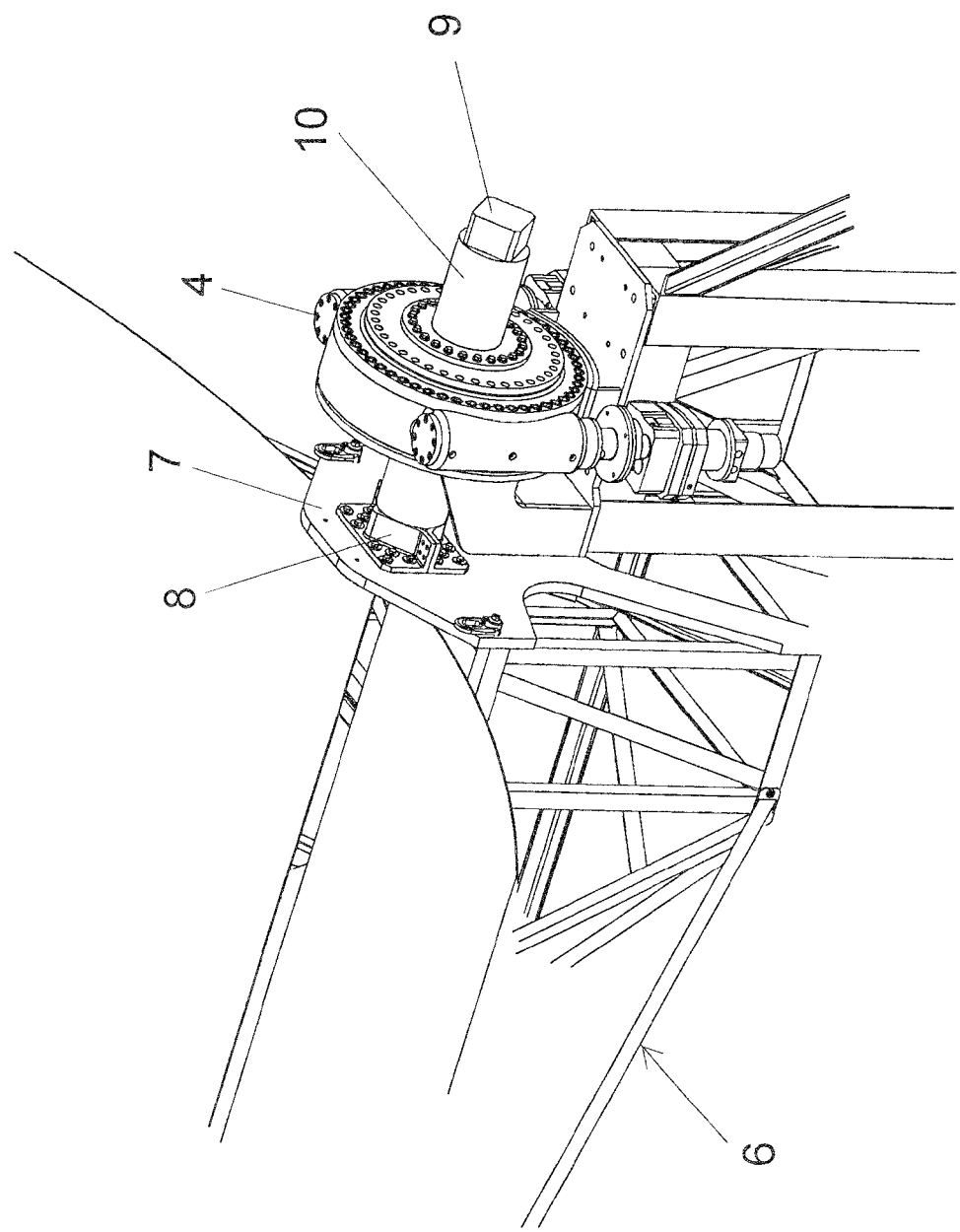
FIG. 4 is a perspective view of an enlarged detail of the rotary drive mechanism of the solar thermal tracker of the invention.

The object of the invention relates to a solar tracker incorporating a parabolic cylindrical thermal concentrator for the use of solar energy, applied for heating a fluid.

The thermal concentrator of the proposed solar tracker consists of a lattice structure (1) on which there is arranged a parabolic cylindrical distribution (2) of mirrors (2.1), said mirrors (2.1) projecting towards a tubular duct (3), the lattice structure (1) being coupled to a rotary drive mechanism (4), the assembly being arranged on support pillars (5).

The lattice structure (1) forms arms (6) which are made up of an assembly of profiles (6.2), on the front edge of the mentioned arms (6) there being arranged a profile (6.1) defining a curved shape which is curved according to a parabolic cylindrical curvature.

The mirrors (2.1) forming the distribution (2) of the parabolic cylindrical thermal concentrator are incorporated on said profile (6.1) of the front edge of the arms (6), such that the curved shape of said profiles (6.1) simplifies the assembly of the mirrors (2.1), because the arrangement of the latter to form the parabolic cylindrical distribution (2) is adjusted to the curvature of those profiles (6.1), allowing an easy placement of the mirrors (2.1) so that they are positioned according to the parabolic cylindrical distribution (2).

Said arrangement allows the assembly of the mirrors (2.1) on the profiles (6.1) of the support arms (6) with a single type of securing parts (11) because the distance between the mirrors (2.1) and the assembly profiles (6.1) is constant, which allows a fast and easy assembly of the mirrors (2.1).

The ends of the lattice structure (1) incorporate plates (7), a torsion box (8) being arranged an the plates (7) of the ends coinciding with the rotary drive mechanism (4), in which torsion box the transmission shaft (10) of the mechanism (4) fits, the torsion box (8) forming a polygonal shape, in correspondence with which the transmission shaft (10) of the mechanism (4) forms a reciprocal polygonal-shaped end portion (9), by means of which said transmission shaft (10) fits in the torsion box (8).

The drive mechanism (4) thus turns the transmission shaft (10), which transmits the rotation to the torsion box (8), turning the lattice structure (1) with it, thus achieving a rotary drive of the structural assembly of the thermal concentrator with absolute precision, because with the coupling of the rotary transmission being established between polygonal shapes, it does not allow any slipping.

The invention claimed is:

1. A solar tracker with thermal concentration comprising:
   an elongated lattice structure coupled to a rotary drive mechanism and arranged on a support pillar;
   the lattice structure having transverse arms which form a curved profile which is curved according to the curvature of a parabolic cylindrical shape;
   a plurality of mirrors mounted on the arms having the curved profile and focused towards a common area of projection; and
   a polygonal coupling coupled to a rotary drive transmission device arranged between the lattice structure and the rotary drive mechanism.

2. The solar tracker with thermal concentration according to claim 1, wherein the assembly of the plurality of mirrors on the curved profile is established by means of securing parts at several fastening points which is a fixed distance between the plurality of mirrors and the assembly profile and which are identical at all the fastening points.

3. The solar tracker with thermal concentration according to claim 1, wherein the coupling of the rotary drive transmission is established by the fitting between a polygonal shape of a torsion box associated with the lattice structure and a polygonal-shaped end portion formed by a transmission shaft of the rotary drive mechanism.

* * * * *